A. D. PUFFER.
FOUNTAINS FOR MINERAL OR OTHER WATERS, &c.

No. 181,103. Patented Aug. 15, 1876.

Witnesses.
F. Hunnewell.
W. C. Boardman.

Inventor.
A. D. Puffer.
F. Curtis. Atty.

UNITED STATES PATENT OFFICE.

ALVIN D. PUFFER, OF BOSTON, MASSACHUSETTS.

IMPROVEMENT IN FOUNTAINS FOR MINERAL OR OTHER WATERS, &c.

Specification forming part of Letters Patent No. 181,103, dated August 15, 1876; application filed June 10, 1876.

*To all whom it may concern:*

Be it known that I, ALVIN D. PUFFER, of Boston, Suffolk county, Massachusetts, have invented certain Improvements in Fountains for Mineral or other Waters or Liquids under Pressure, of which the following is a specification:

My present improvements relate to fountains, (so called,) or ornamental structures in which are located the faucets from which waters under pressure, and used as beverages— such as soda-water, sirups, and mineral waters—are drawn, the purpose of my present improvement being to greatly reduce the cost of this class of apparatus and economise room without sacrificing their ornamental appearance or impairing their efficiency.

The essential features in this apparatus consist, mainly, in the employment of a hollow structure, which may be in the form of a tube erected into an arch, as shown in the accompanying drawings, or in any form which taste or circumstances may dictate, such structure containing within it the discharging termini or outlets of the various pipes through which the aerated or other liquids pass, and being provided with faucets, which connect with such pipes and regulate the discharge through them, the whole being substantially as hereinafter explained.

Figure 1:
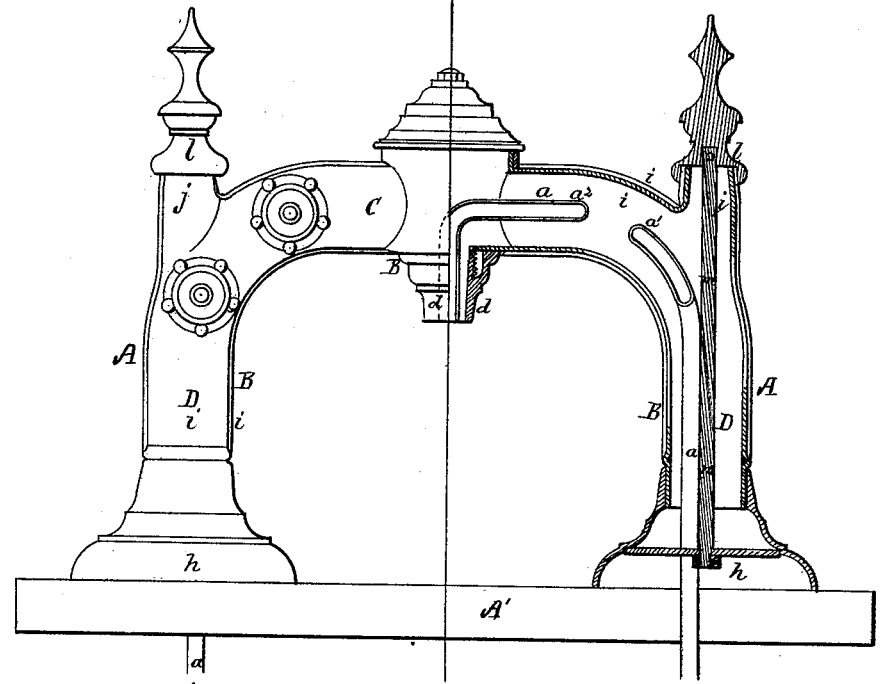
Figure 2:
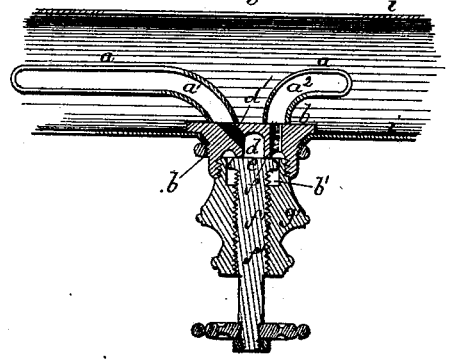
Figure 3:
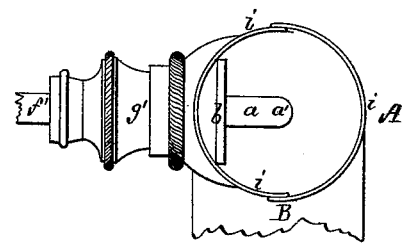

The drawings accompanying this specification represent, in Figure 1, a sectional elevation, and in Figs. 2 and 3 partial sections, of a device embodying my improvements.

In these drawings, A represents a structure composed of a cylindrical tube, B, sprung into an arch, of which C is the crown, and D D the chords or upright columns, the whole being erected upon a suitable tablet or slab, A'. Within the interior of each column D I assemble the outlet ends of a series of pipes, $a$ $a$, &c., such pipes being connected with and constituting outlets of tanks or vessels containing mineral waters of various flavors, or other aerated waters or liquids which may be used as beverages. The extreme ends of the said pipes $a$ $a$ are massed together in a central orifice or mouth, $d$, of the structure A, in order that a tumbler or drinking-vessel placed upon the slab A' may receive the contents of any one of such pipes.

To obtain a high degree of finish and an ornamental appearance, and to secure economy in manufacture, as well as other desirable features, it is essential that the pipes shall be entirely concealed within the structure A, and that the valves which govern the flow of liquids through the various pipes shall be operated from the outside of such structure. To permit this to be accomplished is the main purpose of my present invention; and in carrying it out I form the structure in two parts or halves, which enables me to effect the connection of the valves and pipes from the inside, and I subsequently unite or confine these two parts together in a peculiar manner, which constitutes an incidental feature in my invention.

At some proper point in each pipe $a$ I attach a valve for regulating the flow of liquid, and the method of effecting such attachment which I have employed in the present instance consists as follows: I sever the pipe and connect the adjacent ends $a^1$ $a^2$ to a disk, $b$, which is formed with a valve-chamber, $b'$, and secured within an opening made through one side of the structure A, one end or portion, $a^2$, of such pipes communicating with an inlet-port, $c$, which is created in the disk, and enters the valve-chamber $b'$, while the other end or portion of such pipe communicates with an outlet or discharge-port, $d'$, leading from the valve-chamber. Disposed within each valve-chamber $b'$ is a valve, $e$, which operates with a valve-seat, $f$, surrounding the discharge-port $d$, such valve having a stem, $f'$, which extends outward through a guide or cap, $g'$, which is disposed upon the outside of the structure A, and secured in a proper manner to the disk $b$. A male screw-thread is cut upon the valve-stem, to enter a female thread cut in the tubular guide, and by which the requisite movements of the valve are effected.

Upon opening the valve, liquid flows from the pipe $a$, through the port $c$, into the valve-chamber $b'$, and from the latter, through the port $d$, into the outlet end of the pipe, and is discharged from the latter.

The tubular structure B, above the pedestals $h$ $h$, is formed in halves $i$ $i$, as shown in the accompanying drawings, in order, as before stated, that the valves may be connected with the pipes from the inside; and to confine these halves securely together without the aid of solder, I form upon each semi-cylindrical upright tapering extensions $j\ j$, and lap one half upon the other, subsequently driving upon the conical tube thus formed a cylindrical cap or tube, $l$. The lower ends of the chords or columns D D are let into the pedestals $h$, and a bolt, $m$, connects each cap $l$ with the next adjacent pedestal.

Upon the center of the crown of the arch C a statuette or ornament of any desired character may be placed, which will add very materially to the ornamental appearance of the whole.

When it is desired to draw a glass of aerated water from some one of the pipes $a$, a tumbler or other receptacle is placed upon the slab A', immediately beneath the orifice $d$, before named, and the faucet communicating with such pipe is opened, the beverage being thereby permitted to flow through the outlet of the said pipe into the tumbler, and the faucet then closed.

One prominent advantage of my present device consists in the fact that, to a very great extent, it lessens the cost and reduces the size of apparatus, which heretofore has been very expensive and bulky. In addition to this, access is readily had to the various valves, and the whole presents a very ornamental appearance.

Having thus described the nature and purpose of my invention, I claim as follows:

1. The combination of the hollow structure A, pipes $a\ a$, faucets $b\ b$, and common discharge opening $d$, substantially as, and for purposes stated.

2. The outlet ends of the pipes $a\ a$, massed at a suitable point in the structure A, in order that a drinking-vessel placed below them may receive liquid discharged from one of them, substantially as and for purposes stated.

A. D. PUFFER.

Witnesses:
A. B. GILL,
W. E. BOARDMAN.